United States Patent [19]
Aartman

[11] 3,797,085
[45] Mar. 19, 1974

[54] METHOD OF REPAIRING A PART HAVING ERODED OR DAMAGED GUIDE VANES

[75] Inventor: John M. Aartman, Beaconsfield, Quebec, Canada

[73] Assignee: Air Canada, Montreal, Quebec, Canada

[22] Filed: Oct. 10, 1972

[21] Appl. No.: 295,891

[30] Foreign Application Priority Data
Aug. 22, 1972   Canada................................. 149934

[52] U.S. Cl.......... 29/156.8 R, 29/156.8 B, 29/401, 415/211
[51] Int. Cl................................................ B23p 7/00
[58] Field of Search........ 29/401, 156.8 B, 156.8 R; 415/211, DIG. 3

[56] References Cited
UNITED STATES PATENTS

| | | | |
|---|---|---|---|
| 1,932,278 | 10/1933 | Lacey............................ | 29/156.8 R |
| 2,773,169 | 12/1956 | Lees.............................. | 29/156.8 B |
| 2,945,290 | 7/1960 | Walsh............................ | 29/156.8 R |
| 3,593,406 | 7/1971 | Jones et al..................... | 29/401 |
| 3,650,635 | 3/1972 | Wachtell........................ | 29/401 X |

*Primary Examiner*—Charles W. Lanham
*Assistant Examiner*—D. C. Reiley, III

[57] ABSTRACT

A method of repairing a guide vane part such as used in a turbine or a compressor, and having a series of peripheral openings defined by a series of guide vanes extending between two axially spaced housing portions. The method includes cutting the housing into two pieces along a radial plane extending through the junctions of the ends of the vanes with one housing portion, discarding the other housing portion, and providing a replacement housing portion with vanes and with at least some of the vanes having extensions. A series of apertures as provided in the remaining housing portion corresponding in size and position to the vane extensions, and the vane extensions are inserted into the apertures in the remaining housing portion from one side thereof to cause the free ends of the vane extensions to project through the apertures on the opposite side of the remaining housing portion. The projecting ends of the vane extensions are then secured to the remaining housing portion.

4 Claims, 8 Drawing Figures

METHOD OF REPAIRING A PART HAVING ERODED OR DAMAGED GUIDE VANES

This invention relates to the repair of guide vanes, used for a turbine or compressor, which extend between two axially spaced housing portions, with openings between the vanes serving as inlets or outlets for working fluid.

After a period of use, the guide vanes become eroded and hence inefficient. This is a problem especially in the aircraft industry, for example in the auxiliary power units which are used in some aircraft. Although attempts have been made to devise a suitable method of repairing the guide vanes, no satisfactory repair technique has been found in view of the high temperatuere performance required of aircraft components, and hence it has been necessary to replace the complete part, with consequent expense.

It is therefore an object of the invention to provide a satisfactory repair process for such guide vanes.

According to the invention, the vane housing is cut into two pieces along a radial plane extending through the junctions of the ends of the vanes with one of the housing portions. The housing portion carrying the vanes is discarded, and a replacement portion is provided and secured to the remaining portion. In the replacement portion, at least some of the vanes may be provided with an extension, and the remaining portion worked to provide a series of apertures corresponding in size and position to the vane extensions, the vane extensions on the replacement portion then being inserted into the apertures in the remaining portion so that the free ends of the vane extensions project through the apertures on the opposite side of the remaining portion. The projecting vane portions are then secured to the remaining portion.

Trials conducted with products of this process have confirmed that it is possible to produce a repaired guide vane part which meets the required high standards of the aircraft industry, and also that the cost of repair can be considerably less than the cost of a completely new guide vane part.

One embodiment of the invention will now be described, by way of example, with reference to the accompanying drawings, of which:

Figure 1:
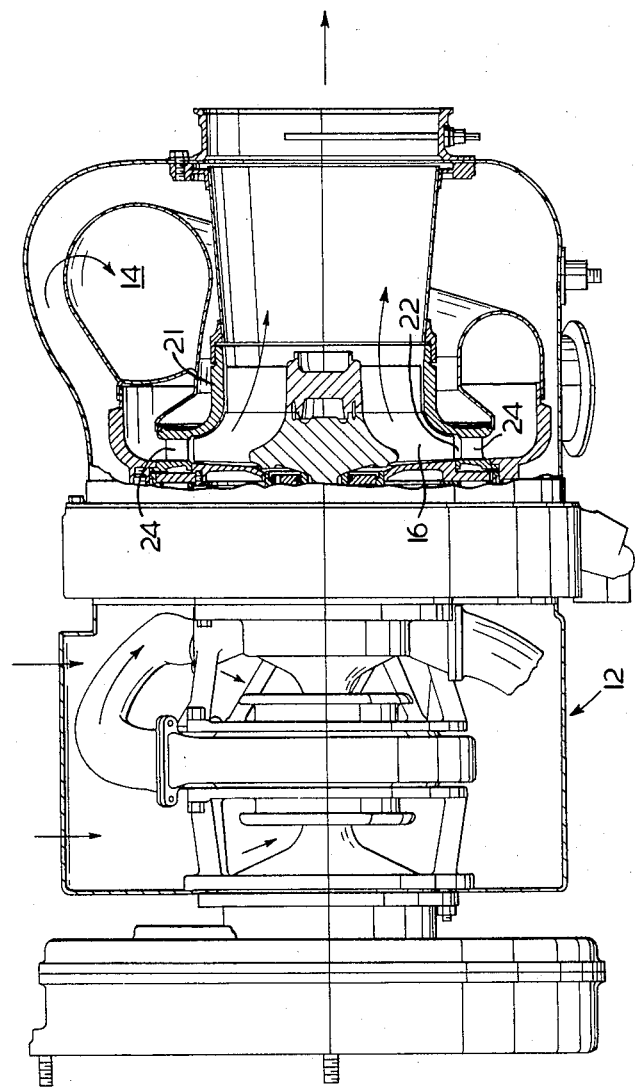
FIG. 1 is a longitudinal view, partly in section, of an auxiliary power unit of the type used in aircraft.

Referring to the drawings, FIG. 1 shows an auxiliary power unit of the kind which is used in some aircraft to provide electrical and pneumatic power, when the main engines are not running. The auxiliary power unit is a gas turbine engine, with air entering through a compressor section 12 to a combustion chamber (not shown). After combustion, the gases pass through a scroll 14 through guide vanes 24 into the turbine section of the engine to drive the turbine 16, which in turn drives various auxiliary equipment.

Figure 2:
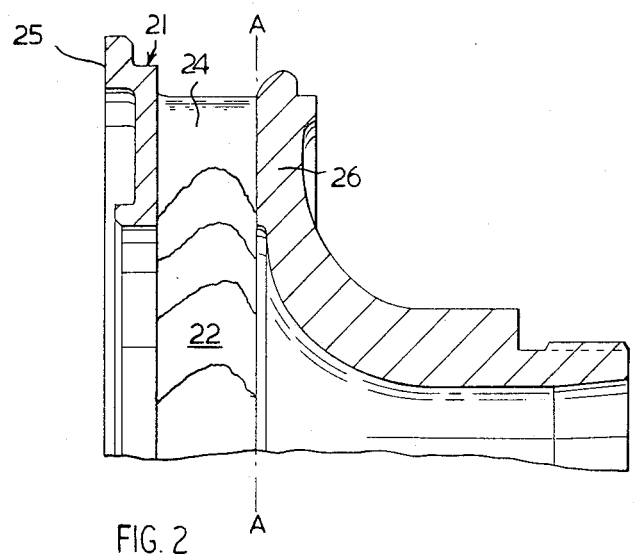
FIG. 2 is a longitudinal, sectional, fragmentary view of the guide vane part showing wear on the inner edges of the vanes.
Figure 3:
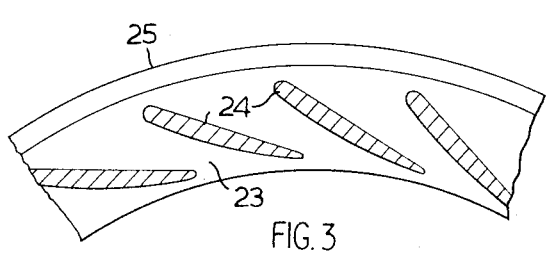
FIG. 3 is a transverse sectional view of a segment of the guide vane assembly taken along the line A—A of FIG. 2.
Figure 4:
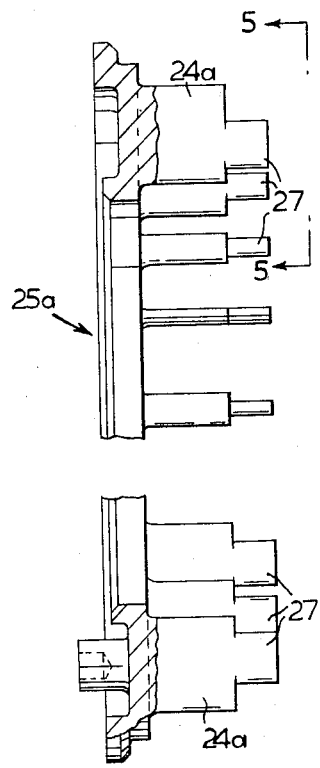
FIG. 4 is a side view, partly in section and partly broken away, of a replacement portion.
Figure 5:
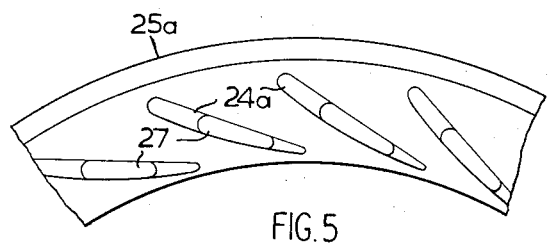
FIG. 5 is a rear view of a segment of the replacement portion, taken along the line 5—5 of FIG. 6.
Figure 6:
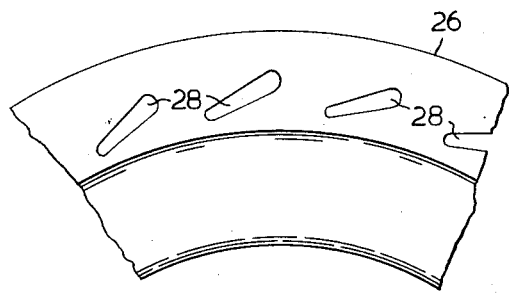
FIG. 6 is a front view of a segment of the remaining portion showing the drilled slots.
Figure 7:
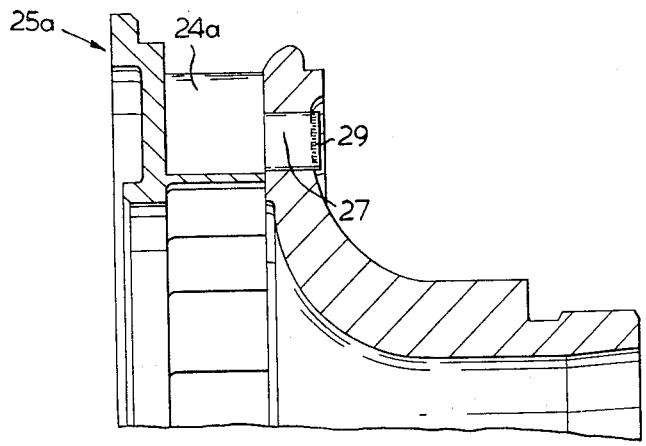
FIG. 7 is a longitudinal sectional view of the replacement portion connected to the remaining portion, taken generally along the line 7—7 of FIG. 8.

FIGS. 2 and 3 show the inlet guide vane part, which has an annular housing 21 forming a chamber 22 for the turbine 16, and which also has a series of peripheral openings 23 defined by a series of guide vanes 24 extending between two axially spaced housing portions 25, 26. Gas from the combustion chamber passes through the openings 23 between the guide vanes 24 in a generally tangential direction onto the turbine. FIG. 2 shows how the inner edges of the vanes 24 become eroded. Generally speaking, the damage is caused by particles entrained in the gas and the high operating temperature.

When the damage increasingly renders the guide vanes inefficient, the part is repared by cutting it into two pieces along the radial plane A—A, shown in FIG. 2, which extends through the junctions of the ends of the vanes 24 with the housing portion 26. The housing portion 25 carrying the damaged vanes 24 is then discarded.

A replacement housing portion 25a is provided with similar dimensions to the discarded portion 25, but with each vane 24a having an extension 27 of the same thickness as the vane 24a but spaced from the inner and outer edges thereof. The remaining part 26 is worked (for example drilled on spark eroded) to provide a series of slots 28 corresponding in size and position to the vane extensions 27. The length of each vane extension 27 is slightly greater than the thickness of the housing portion 26 in which the slots 28 are made.

Figure 8:
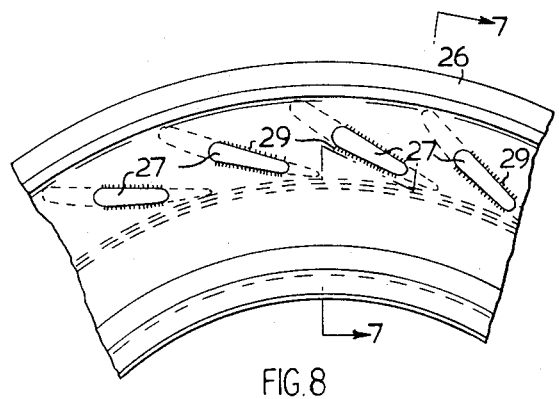
FIG. 8 is a rear view of a segment of the repaired part showing the welding of the vane extensions to the remaining portion.

The replacement housing portion 25a is assembled with the remaining housing portion 26 by inserting the vane extensions 27 into the respective slots 28, so that the free ends 29 of the vane extensions 27 project through the rear face of the housing portion 26. The projecting vane ends 29 are then welded to the rear face of the housing portion 26, as shown in FIG. 8. Since the vane extensions 27 are spaced from the inner and outer edges of the vanes 24a, each vane 24a has an inner and outer end portion abutting the adjacent face of the remaining housing portion 26.

In one specific example, the replacement housing portion 25a was a casting of X40 Stellite, and the housing part 26 was also a casting. The weld was a tungsten inert gas weld using AMS 5382 rod, and was made on opposite sides of each vane extension 27, as shown.

Although the foregoing description has been concerned with the repair of an inlet guide vane part originally formed as a one-piece product, a repaired part can of course itself be repaired in the manner described, and in fact the part could originally be manufactured in two pieces which are then welded together.

What I claim is:

1. A method of repairing a guide vane part such as used in a turbine or a compressor, and having a series of peripheral openings defined by a series of guide vanes extending between two axially spaced housing portions, the method including cutting the housing into two pieces along a radial plane extending through the junctions of the ends of the vanes with one housing portion, discarding the other housing portion, providing a replacement housing portion with vanes and with at least some of the vanes having extensions, providing a series of apertures in the remaining housing portion corresponding in size and position to the vane extensions, inserting the vane extensions into the apertures in the remaining housing portion from one side thereof to cause the free ends of the vane extensions to project through the apertures on the opposite side of the remaining housing portion, and securing the projecting ends of the vane extensions to the remaining housing portion.

2. A method according to claim 1 including providing extensions on all the vanes of the replacement housing portion.

3. A method according to claim 1 including spacing each vane extension from the inner and outer edges of the vane.

4. A method according to claim 1 including securing the projecting ends of the vane extensions to the remaining housing portion by welding.

* * * * *